(12) United States Patent
Faucher et al.

(10) Patent No.: US 7,251,470 B2
(45) Date of Patent: Jul. 31, 2007

(54) EMERGENCY RESPONSE SYSTEM WITH PERSONAL EMERGENCY DEVICE

(75) Inventors: John Faucher, Escondido, CA (US); Mandyam Vikram, San Diego, CA (US)

(73) Assignee: Nokia Corporation, Espoo (FI)

( * ) Notice: Subject to any disclaimer, the term of this patent is extended or adjusted under 35 U.S.C. 154(b) by 526 days.

(21) Appl. No.: 10/607,180

(22) Filed: Jun. 25, 2003

(65) Prior Publication Data

US 2004/0266390 A1    Dec. 30, 2004

(51) Int. Cl.
*H04M 11/04* (2006.01)

(52) U.S. Cl. ................. 455/404.1; 455/90.1; 455/41.2; 340/539.12

(58) Field of Classification Search ........... 340/286.07, 340/534.11, 539.1, 539.12, 539.14, 572.1, 340/573.1; 455/41.2, 90.1, 40.1, 404.1–404.2
See application file for complete search history.

(56) References Cited

U.S. PATENT DOCUMENTS

| | | | |
|---|---|---|---|
| 5,181,519 A | 1/1993 | Bible | 128/704 |
| 5,228,449 A | 7/1993 | Christ et al. | 128/691 |
| 5,835,907 A | 11/1998 | Newman | 707/10 |
| 5,914,675 A | 6/1999 | Tognazzini | 340/989 |
| 5,915,675 A * | 6/1999 | Chen | 267/132 |
| 5,966,692 A | 10/1999 | Langer et al. | 705/3 |
| 5,971,921 A * | 10/1999 | Timbel | 600/300 |
| 6,073,004 A * | 6/2000 | Balachandran | 455/404.2 |
| 6,117,073 A | 9/2000 | Jones et al. | 600/300 |
| 6,445,300 B1 * | 9/2002 | Luman | 340/573.1 |
| 6,509,830 B1 | 1/2003 | Elliott | 340/286.02 |
| 6,671,350 B1 * | 12/2003 | Oxley | 379/45 |
| 2003/0001743 A1 * | 1/2003 | Menard | 340/573.1 |
| 2003/0069002 A1 * | 4/2003 | Hunter et al. | 455/404 |
| 2003/0128121 A1 * | 7/2003 | Nee | 340/573.1 |

FOREIGN PATENT DOCUMENTS

WO    WO-02/32098 A2    4/2002

* cited by examiner

*Primary Examiner*—Joseph Feild
*Assistant Examiner*—Jaime Holliday
(74) *Attorney, Agent, or Firm*—Harrington & Smith, PC

(57) ABSTRACT

An emergency request system includes a portable emergency device designed to be carried on the person of a user, the emergency device containing stored data useful in the event of an emergency, such as data on medical problems of the user, contact information of a person able to supply information when the user is incapacitated and location information as to the present location of the user. The emergency request system includes a cellular phone that supports Bluetooth and software that interacts with the portable emergency device and the 911 emergency system.

26 Claims, 3 Drawing Sheets

DATA

I    IDENTITY

II    MEDICAL INFORMATION
KNOWN PROBLEMS
    HEART, ASTHMA, EPILEPSY

III    CONTACT
    DOCTOR, HOME, PERSONAL CONTACT (SOMEONE WHO KNOWS HISTORY)

IV    LOCATION
    GPS
    TELEPHONE SYSTEM

V    FOREIGN LANGUAGE

FIG. 2

SEQUENCE

ACTIVATE
    VICTIM PRESSES BUTTON DATA SENT TO PHONE
MOBILE PHONE SENDS DATA TO 911 TERMINAL

911 OPERATOR VIEWS DATA
    911 OPERATOR OPTIONALLY ASKS FOR VOICE
    RESPONSE AND VIEWS DATA AND CALLS VICTIM.

IF NO VOICE RESPONSE, ASSUME MEDICAL EMERGENCY
    911 OPERATOR CAN REREQUEST DATA
    (IF IT CAME IN IMPROPERLY)

(911 OPERATOR MAKES FURTHER QUERIES USING
    CONTACT INFORMATION)

911 OPERATOR DISPATCHES ASSISTANCE

FIG.3

EMERGENCY RESPONSE SYSTEM WITH PERSONAL EMERGENCY DEVICE

TECHNICAL FIELD

The field of the invention is that of wireless communications, in particular, contacting help in the event of a medical emergency.

BACKGROUND OF THE INVENTION

Contacting a source of help in the event of an emergency is a problem that has been addressed in many ways over the years. A common solution in the United States of America is the "911" telephone number, which connects the caller to an operator trained to identify a number of emergency situations and having access to communication equipment to contact the police, ambulance, fire department and the like. Similar facilities are available in many countries.

Each year, however, many situations are not responded to because the victim cannot get to a telephone or cannot dial and/or speak. Many medical emergencies incapacitate the victims so severely that they are unable to move or to summon help. For example, many people fall, breaking a hip or otherwise becoming sufficiently incapacitated that they are unable to reach a phone, even though they could dial and call for help if they were able to get to the phone.

In other cases, victims are unable to speak (e.g. in the event of a stroke) although they are able to reach a phone.

In still other cases, the victim is able to reach a phone and call, but does not know where he or she is sufficiently well to give directions to emergency personnel.

Thus, there is a need for a system that will call for help once activated and compensate for incapacity of various kinds.

SUMMARY OF THE INVENTION

The invention relates to a system for calling an emergency number in response to a simple activation signal.

A feature of the invention is the provision in a wearable (portable) emergency device of stored information relevant to various emergency situations.

An additional feature of the invention is the capability of the device to contain and the capability of seamlessly updating unique user information and any necessary medical information relevant to the user.

Another feature of the invention is a provision for an emergency service operator to query the stored information.

Another feature of the invention is a piece of software on the mobile phone that interacts with the device to convey the user data stored on the wearable device to the 911 network.

BRIEF DESCRIPTION OF THE DRAWING

FIG. 2 illustrates a table of stored information.

FIG. 3 illustrates a sequence in an emergency call using the invention.

BEST MODE OF CARRYING OUT THE INVENTION

Figure 1:
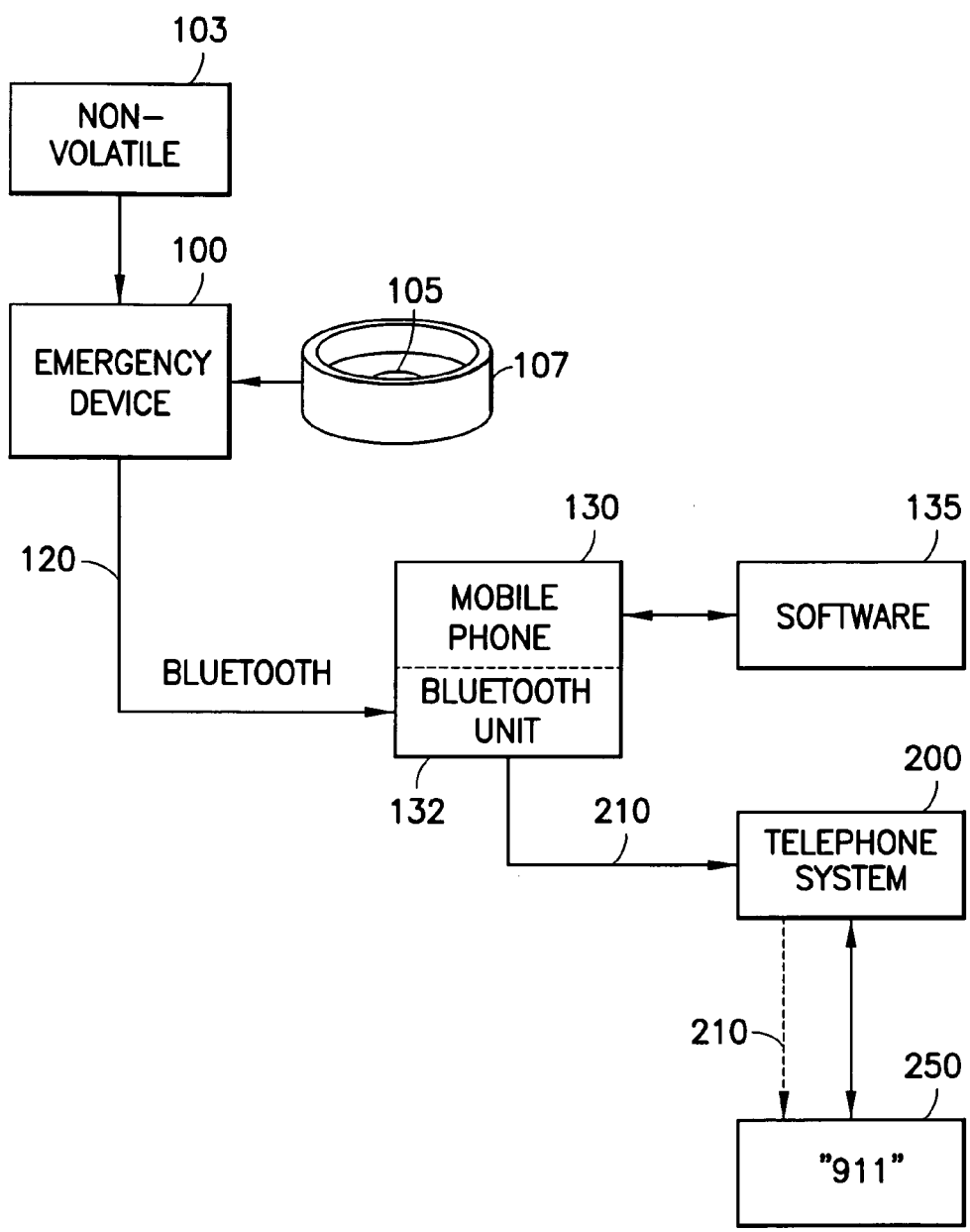
FIG. 1 illustrates in condensed form a system for use with the invention.

FIG. 1 shows a schematic view of a system for using the invention, in which an emergency device 100 responds to the press of a button 105 to communicate with a mobile telephone 130, illustratively through the Bluetooth wireless protocol. Telephone 130 calls the "911" emergency number (shown as box 250) through the local telephone company 200.

According to the invention, if the user is incapacitated and unable to supply information that the 911 operator needs in order to decide what support to send and where to send it, the information is supplied from a memory attached to the emergency device.

Emergency device 100 may take any convenient form—a bracelet, pin, watch, etc. Functionally, it is a wireless transmitter that initiates communication with the mobile phone 130 and supplies information from non-volatile memory 103 in response to prompts from the 911 operator.

Software 135, stored in the mobile phone, executes some functions in the sequence—i.e. calling the 911 operator and, in response to signals from the operator, querying the data in memory 103. Other relevant software may be stored in system 200 and invoked by telephone 130.

As an example, consider a situation in which the user of the system suffers a heart attack or other incapacitating situation. He or she presses button 105, which initiates the sequence according to the invention. Button 105 may be replaced by any activation device that can be activated by the user/victim.

Device 100 transmits a signal to phone 130, illustratively a mobile phone carried by the victim. Phone 130 calls 911. When the operator answers, a signal transmitted by the 911 telephone apparatus is passed through the system to alert the 911 operator that stored information is available.

If the victim is able to speak, the 911 operator can perform the usual queries. The stored medical information is available and can be sent either automatically or in response to a signal from device 100 or phone 130. Some of the stored medical information may have been forgotten by the victim and therefore useful even if the victim can speak.

If the victim cannot speak, the operator can examine the stored information and use it to assist in the decision as to what help to send. For example, the information may contain data that the victim has hypertension and is a candidate for a stroke.

A useful feature of the invention is that, if the telephone is equipped with a Global Positioning System (GPS) receiver, the phone can be programmed to transmit that information to the 911 operator. At least once, a kidnapping victim was able to turn on his mobile phone and call 911, but did not know his location. The local phone system did not have the capacity to locate the mobile phone and the police were unable to assist.

FIG. 2 shows a list of information that may be supplied according to the invention. Identity would include the information that 911 ordinarily asks—name, address, phone number (home, office, mobile), etc. Medical Information may include known problems, such as heart conditions, asthma, epilepsy, allergies, etc. Contact information may include one or more names and phone numbers of people (including the victim's doctor) who know the victim and can supply some information, e.g. the intended location of the victim, clothing worn that day, etc. Location information may be supplied by a GPS receiver in the phone 130 or by the local phone system if it has equipment that can calculate the victim's location by analyzing signals received by a number of base stations. If the victim does not speak English or another language spoken by the 911 operator, the stored data could include recorded phrases in the victim's language that could by played in response to a signal from the 911 operator, e.g. "an ambulance is on the way".

FIG. 3 shows a sample sequence of a response to a signal from a victim.

The victim has pressed the button 105, and the emergency device has sent a signal to mobile phone 130, which is turned on.

Phone 130 calls 911, using the usual format of the local telephone company.

The 911 operator answers and receives a signal (e.g. a recorded message) informing her that an automated emergency call has been placed. The term "911 operator" is used for convenience. The functions described could be performed by another agency or by a private alarm service.

The 911 operator answers by voice, asking for a response. (Optionally, the data are transmitted whether the victim can answer or not and appear on a screen for the 911 operator.)

If there is no voice response, it is assumed that there is a medical emergency.

Preferably, the data are transmitted in response to a request from the 911 operator and appear on a screen for the 911 operator. This approach reduces the complexity of transmitting the data in a different format from voice (e.g. in text messaging format) and arranging for the data to appear on the screen of the operator handling the voice call, since the request from the operator can trigger a sequence of actions that direct the data from the calling phone to that particular operator's screen.

The operator will then step through the standard sequence, making contact with the contacts listed if appropriate, and transmitting an ambulance or police as appropriate.

If the default phone is turned off or otherwise malfunctioning, the system may:—1) automatically turn phone 130 on or 2) other phones in the vicinity would respond to the Bluetooth signal. Since the Bluetooth signal is RF, it will be received by all phones in range. An alternative approach is that if the emergency device does not receive a response from the default phone, it automatically signals other phones with a distinctive signal pattern and any phone within range calls 911 and relays the data. Another alternative approach is to ask nearby phone users for assistance. Which of these approaches, if any, is used would depend on considerations other than technical, such as legal liability.

Mobile handset 130 will support Bluetooth.

Software 135 will have appropriate commands to stand by to receive the Bluetooth signal, to query the emergency device for data, call 911 and then to relay the data as described above.

Preferably, the call to 911 will be done using the usual phone signals as much as possible to minimize the changes to be made to the phone system. Data (stored data from memory, GPS data) will be sent to 911 in appropriate format (e.g. text messaging for the memory data). A wakeup sequence and circuitry to carry it out will be stored within the handset, for use in the situations when a) the phone's owner is the victim, but the phone is turned off and b) the phone of a victim is turned off and a third party is in range of the Bluetooth signal.

It will be evident that it is important that the stored data are current. As a default, the stored data may be entered by connecting the activation device to a keypad and updating the data. If the system relies on the user to update the data, that would be a potential source of errors. More conveniently, the data could be updated by personnel in the doctor's office, who are likely to make few entry errors and can be trained to enter the data as part of their routine. Additionally, the data could be updated by the pharmacist dispensing medications. In one or both of these cases, the data could be entered by keying into a Bluetooth transmitter that transmits the data (or is connected by a cable) to device 100.

The system can be implemented with many alternatives.

For example, it is desirable that the 911 equipment does not have to be modified to use the information. One potential problem is that the stored data will not fit (be compatible) with the format for voice calls, so that there would have to be some accommodation made to present the data to the 911 operator on a screen for easy viewing. One approach is that System 200 is programmed to receive a signal from phone 130 that a system according to the invention is in use and transmits a notice to 911, together with data identifying the screen data. The screen data is transmitted on a parallel channel 210 and is routed within the 911 facility to the appropriate operator. The local phone company would take care of the technical details, so that adoption of the invention does not depend on the technical capabilities of the 911 department.

Another option is that the system includes automatic activation—by a pacemaker, or other monitoring device, that senses when the victim is suffering an attack.

Yet another option is that of a non-medical emergency when the victim cannot dial, such as a holdup. A simple button press is easier to perform during a stressful situation than dialing the telephone.

In FIG. 1, button 105 is shown as surrounded by a cylinder 107 that extends higher than the button and thereby reduces the chance of accidentally pressing the button. Those skilled in the art will readily be able to devise other methods of avoiding accidentally calling 911.

Although the invention has been described with respect to a limited number of embodiments, those skilled in the art will appreciate that other embodiments may be constructed within the spirit and scope of the following claims.

We claim:

1. A system for contacting help comprising: an emergency device carried on the person of a user, said emergency device having a wireless sending unit activated by an activation unit, wherein the emergency device is formed so as to prevent accidental activation; a mobile telephone having a wireless receiving unit adapted to receive signals from said wireless sending unit, said mobile telephone being adapted for communicating with a telephone network to call an emergency number; in which said emergency device sends a signal to said mobile telephone in response to the activation of said wireless sending unit; and said mobile telephone calls said emergency number in response to said signal, wherein if the emergency device does not receive a response from the mobile telephone, the emergency device then automatically signals other telephones with a distinctive signal pattern.

2. A system according to claim 1, in which: said signal includes data selected from the group comprising medical information, location and contact information.

3. A system according to claim 2, in which: said emergency device includes stored data on the user's prior medical conditions and any allergies to medication.

4. A system according to claim 1, in which: said emergency device includes stored data on the user's prior medical conditions and any allergies to medication.

5. A system according to claim 4, in which: the mobile telephone sends a signal to a telephone network activating a response from the telephone network.

6. A system according to claim 5, in which: the response from the telephone network comprises at least receiving said stored data and transmitting the stored data to the emergency number.

7. A system according to claim 6, in which: the response from the telephone network includes estimating the location of the user by analyzing signals from the mobile telephone.

8. A system according to claim 5, in which: the response from the telephone network includes estimating the location of the user by analyzing signals from the mobile telephone.

9. A system according to claim 1, in which: said mobile telephone includes means for estimating the location of the user.

10. A system according to claim 9, in which: the means for estimating the location of the user comprises a GPS receiver.

11. A system according to claim 1, wherein the emergency device comprises a button and a cylinder where the button is surrounded by the cylinder which extends higher than the button to reduce the change of accidentally pressing the button.

12. A system according to claim 1, wherein the emergency device is in the form of a bracelet.

13. A system according to claim 1, wherein the emergency device is a personal medical emergency device worn by a person.

14. A system according to claim 1, wherein any telephone within range that receives the distinctive signal pattern calls the emergency number and relays emergency data of the emergency device.

15. An apparatus for contacting help comprising: an emergency device carried on the person of a user, said emergency device having a wireless sending unit activated by an activation unit; and a mobile telephone having a wireless receiving unit adapted to receive signals from said wireless sending unit, said mobile telephone being adapted for communicating with a telephone network to call an emergency number; in which said emergency device sends a signal to said mobile telephone in response to the activation of said wireless sending unit; and said mobile telephone calls said emergency number in response to said signal, if an operator at the emergency number answers by voice and then does not receive a voice response in reply, the signal from the medical devices is interpreted as a medical emergency, wherein if the emergency device does not receive a response from the mobile telephone, the emergency device then automatically signals other telephones with a distinctive signal pattern.

16. An apparatus according to claim 15, in which: said signal includes data selected from the group comprising medical information, location and contact information.

17. An apparatus according to claim 16, in which: said emergency device includes stored data on the user's prior medical conditions and any allergies to medication.

18. An apparatus according to claim 15, in which: said emergency device includes stored data on the user's prior medical conditions and any allergies to medication.

19. An apparatus according to claim 15, in which: said mobile telephone includes means for estimating the location of the user.

20. An apparatus according to claim 19, in which: the means for estimating the location of the user comprises a GPS receiver.

21. An article of manufacture comprising a program storage medium readable by a computing device in a mobile telephone handset, the medium embodying instructions executable by the computing device for performing method steps comprising: receiving signals from a wireless sending unit carried on the person of a user, said mobile telephone being adapted for communicating with a telephone network to call an emergency number; in which an emergency device sends a signal to said mobile telephone in response to the activation of said wireless sending unit; and said mobile telephone calls said emergency number in response to said signal, wherein the wireless sending unit is capable of turning on the mobile telephone, wherein if the emergency device does not receive a response from the mobile telephone, the emergency device then automatically signals other telephones with a distinctive signal pattern.

22. An article of manufacture comprising a program storage medium readable by a computing device in a mobile telephone handset according to claim 21, in which: said signal includes data selected from the group comprising medical information, location and contact information.

23. An article of manufacture comprising a program storage medium readable by a computing device in a mobile telephone handset according to claim 22, in which: said emergency device includes stored data on the user's prior medical conditions and any allergies to medication.

24. An article of manufacture comprising a program storage medium readable by a computing device in a mobile telephone handset according to claim 21, in which: said emergency device includes stored data on the users prior medical conditions and any allergies to medication.

25. An article of manufacture comprising a program storage medium readable by a computing device in a mobile telephone handset according to claim 21, in which: said mobile telephone includes means for estimating the location of the user.

26. An article of manufacture comprising a program storage medium readable by a computing device in a mobile telephone handset according to claim 25, in which: the means for estimating the location of the user comprises a GPS receiver.

* * * * *